United States Patent
Kitagawa et al.

[11] Patent Number: 6,008,269
[45] Date of Patent: Dec. 28, 1999

[54] ULTRAVIOLET HARDENING TYPE INK COMPOSITIONS WITH A TEMPERATURE-SENSITIVE COLOR CHANGE PROPERTY

[75] Inventors: Yosuke Kitagawa; Ryuichi Hoshikawa, both of Kyoto, Japan

[73] Assignee: Matsui Shikiso Chemical Co., Ltd., Kyoto, Japan

[21] Appl. No.: 08/972,293

[22] Filed: Nov. 18, 1997

[30] Foreign Application Priority Data

Nov. 25, 1996 [JP] Japan ..................... 8-328030

[51] Int. Cl.$^6$ ................. C08F 2/46; C08F 2/44
[52] U.S. Cl. ................. 522/44; 522/39; 522/42; 522/46; 522/75; 522/8; 522/909; 523/160
[58] Field of Search ................. 522/75, 8, 909, 522/44, 39, 42, 46; 523/160

[56] References Cited

U.S. PATENT DOCUMENTS

| | | | |
|---|---|---|---|
| 4,421,560 | 12/1983 | Kito et al. | 106/21 |
| 4,425,161 | 1/1984 | Shibahashi et al. | 106/21 |
| 4,601,588 | 7/1986 | Takahara et al. | 374/106 |
| 4,743,398 | 5/1988 | Brown et al. | 252/408.1 |
| 4,925,727 | 5/1990 | Brown et al. | 428/199 |
| 5,350,633 | 9/1994 | Sumii et al. | 428/402.21 |
| 5,350,634 | 9/1994 | Sumii et al. | 428/208.21 |
| 5,591,255 | 1/1997 | Smalls et al. | 106/21 A |

FOREIGN PATENT DOCUMENTS

| | | |
|---|---|---|
| 4212827 | 10/1992 | Germany . |
| 58-32671 | 2/1983 | Japan . |
| 07324178 | 12/1995 | Japan . |
| 7331090 | 12/1995 | Japan . |

*Primary Examiner*—James J. Seidleck
*Assistant Examiner*—Sanza L. McClendon
*Attorney, Agent, or Firm*—Lyon, P.C.

[57] ABSTRACT

[Problem] To provide ultraviolet hardening type ink compositions with a temperature-sensitive color change property, which has both the hardening property and the printing strength of UV ink and also has an excellent light resistance.

[Solution] Ultraviolet hardening type ink compositions comprising microcapsules with a temperature-sensitive color change property and a photopolymerization initiator, wherein said microcapsules contain no ultraviolet absorber and have the mean diameter of 0.5–50 μm whereas said photopolymerization initiator comprises at least one of the compounds selected from ace tophenone type compounds and benzophenone type compounds.

5 Claims, No Drawings

ULTRAVIOLET HARDENING TYPE INK COMPOSITIONS WITH A TEMPERATURE-SENSITIVE COLOR CHANGE PROPERTY

BACKGROUND OF THE INVENTION

The invention relates to ultraviolet hardening type ink compositions, especially ultraviolet hardening type ink compositions with a temperature-sensitive color change property, in which the color changes reversibly according to a temperature change.

The ultraviolet hardening type ink composition is widely known as a UV ink. Further, various kinds of coloring agents in which the color changes reversibly according to a temperature change are also known, namely, as thermochromic coloring agents.

However, examples using a thermochromic coloring agent as a coloring agent of the UV ink are hardly known, and only a JP, A, 7-324178 is known. This is because the thermochromic coloring agent has the structure that the coloring ingredient is basically included in microcapsules, and due to the fact that it is different in various characteristics compared with the general dye stuffs and pigments, it is considered that there are various restrictions caused by these characteristics.

For example, the following restrictions are cited.

(1) Since the color concentration of a thermochromic coloring agent is extremely low compared with that of the conventional dye stuff and pigment, the large amount is necessarily used in order to get a desired color concentration. However, this hinders the hardening of the UV ink itself and lowers a printing strength after the hardening. Further, this tendency is accelerated by said coloring agent in the form of microcapsules which have an extremely large particle diameter compared with a usual dye stuff and pigment.

(2) Since the light resistance of a thermochromic coloring agent is extremely weak compared with that of the conventional dye stuff and pigment, the addition of an ultraviolet absorber is indispensable. However, since the absorption wave length of such ultraviolet absorber coincides with the one which is necessary for initiating the light hardening of a UV ink, the UV ink including the ultraviolet absorber with a thermochromic coloring agent does not become hardened whatsoever.

In the above-mentioned JP, A, 7-324178, the thermochromic microcapsules containing the ultraviolet absorber having a specific absorption wave length (220–380 nm) and the photopolymerization initiator having a specific absorption wave length (360–450 nm) are used, however, this art requires a sufficient attention for selecting the constituting materials, and can hardly be satisfactory from the practical point of view.

Thus, if a thermochromic coloring agent could be used as a coloring agent for UV ink, various applications thereof could be expected. However, putting it to practical use has not been attained in the state of the art.

SUMMARY OF THE INVENTION

The invention has been accomplished considering the present state like this, and the object of the invention is to provide the ultraviolet hardening type ink compositions with the temperature-sensitive color change property, which has no problem concerning both the hardening property and the printing strength of a UV ink and an excellent light resistance.

As a result of an intensive studies to solve the above problems, it was found that the above problems could be overcome by selecting microcapsules with the temperature-sensitive property containing no ultraviolet absorber and having the specific particle diameter, and specific photopolymerization initiators. Further, based on these finding sand further studies this invention has been accomplished.

Namely, the invention relates to ultraviolet hardening type ink compositions comprising microcapsules with a temperature-sensitive color change property and a photopolymerization initiator, wherein said microcapsules contain no ultraviolet absorber and have the mean diameter of 0.5–50 $\mu$m whereas said photopolymerization initiator comprises at least one of the compounds selected from acetophenone type compounds and benzophenone type compounds.

Consequently, the invention is characterized by selecting the specific constitution in microcapsules with the temperature-sensitive color change property and specific photopolymerization initiators, and the reason for selecting such a constitution is as follows.

First, as to the selection of the microcapsules with the temperature-sensitive color change property of the invention, the mean particle diameter of the microcapsules with the temperature-sensitive color change property is ranging from 0.5 to 50 $\mu$m, preferably from 1 to 30 $\mu$m. This is because it is not preferable that the mean particle diameter of less than 0.5 $\mu$m not only lowers extremely the coloring concentration, but also drastically increases the relative particle number. The invasion of ultraviolet rays into the inside of the ink, which is necessary for the hardening of said ink compositions, is screened due to the increase of the particle, and therefore, the hardening occurs only at a surface, resulting in the remarkable lowering of the hardening property and the strength of said ink compositions. Additionally, in case of the mean particle diameter of more than 50 $\mu$m is because it is not preferable that the used amount necessarily becomes small from the balance with a print-coated thickness, and a sufficient coloring concentration is not obtained, resulting in not only a gritty print surface and a bad touch, but also the lowering of a printing strength.

Further, the ultraviolet absorbers, which are certainly indispensable for the light resistance of the thermochromic coloring agents in the conventional method, are not included in the microcapsules with the temperature-sensitive color change property of the invention. As described below, said ultraviolet absorbers are not needed due to the result that the photopolymerization initiators having a unique characteristic are used in the invention.

In the present invention, the mean particle diameter means the volume base median diameter which can be measured by various kinds of particle distribution measuring apparatus.

As to the selection of photopolymerization initiators in the invention, the reason why a photopolymerization initiators comprising at least one of the compounds selected from acetophenone type compounds or benzophenone type compounds are used is because these compounds show a specifically preferable effect.

Namely, even in the case that microcapsules with the temperature-sensitive color change property are present in a large amount and have a tendency to screen the invasion of ultraviolet rays into the inside, which is necessary for hardening, acetophenone type or benzophenone type compounds have a function capable to attain fully hardening of an ultraviolet hardening type ink composition up to the inside and also have a function to contribute to the improvement of the light resistance of microcapsules with the temperature-sensitive color change property. Since such functions are never shown in any photopolymerization initiator except the said compounds, it can be said that these are the specific characteristics of said compounds.

Therefore, since the photopolymerization initiators having such characteristics are used in the invention, it results to attain a totally unexpected effect that the constitution considered so far to be a necessary condition, that is, containing an ultraviolet absorber for the light resistance of a thermochromic coloring agent becomes unnecessary.

Thus, the reason why the microcapsules with the temperature-sensitive color change property according to the invention have an excellent light resistance though they do not contain the ultraviolet absorber is considered to be perhaps due to the cause that even after the polymerization, acetophenone type and benzophenone type compounds, which are photopolymerization initiators, perhaps remain in a necessary amount to improve the light resistance.

Thus, since the ultraviolet hardening type ink compositions of the invention do not contain an ultraviolet absorber which becomes the cause of the inhibition of hardening of said ink compositions, the hardening property of said ink compositions together with the selection of the mean particle diameter of the microcapsules becomes sufficient.

Consequently, since the ultraviolet hardening type ink compositions with a temperature-sensitive color change property according to the invention are especially excellent not only in the light resistance, but in the hardening property, the temperature-sensitive color change property and the like even without using ultraviolet absorbers, use of the ink compositions of the invention gives a printing matter or the like which have especially excellent characteristics in the light resistance, the hardening property, the temperature-sensitive color change property, and the like.

Additionally, owing to not using the ultraviolet absorbers and the like, the compositions of the invention have less restrictions than that of the conventional methods, whereby the invention is also valuable in a lot of industrial applicabilities.

According to the above, it can be understood that the constituent of the invention has a special meaning (inventiveness).

In the following, the invention will be illustrated in more detail.

The microcapsules with the temperature-sensitive color change property according to the invention should have two indispensable conditions that they do not contain the ultraviolet absorber and their mean particle diameter is in the range of 0.5–50 μm, though, as far as the above two conditions are fulfilled, a product in which the known composition with the temperature-sensitive color change property is microcapsulated by the known microcapsulation method can be used without any restriction as the microcapsules with the temperature-sensitive color change property according to the invention.

Illustrative of the composition with the temperature-sensitive color change property are, for example, a two ingredients type composition consisting of a leuco compound known as a colorant for a pressure-, or heat-sensitive copying paper, including a triphenylmethane phthalide, fluorane, phenothiazine, indolylphthalide, leucoauramine, spiropyran, rhodaminelactam, triphenylmethane, diarylphthalide, triazene, spirophthlane, xanthene, naphtholactam or azomethine types, or the like, and an organic developer known as a developer for the pressure-, or heat-sensitive copying paper, including a benzotriazole, phenol, aromatic carboxylic acid, aliphatic carboxylic acid, thiourea or phosphoric acid types, or their esters or their metal salts, or a three ingredients type composition which is made by adding an organic medium such as an ester, ether, alcohol, ketone, carboxylic acid or azomethine types to said two ingredients type composition, or the other type compositions of every kind which are reversibly color-changeable according to a change of temperature, including a liquid crystal composition or the like.

Further, it is needless to say that in the color-change phenomenon, meta-reversible one accompanying a hysteresis is included when temperature increases or decreases.

Illustrative of the known microcapsulation methods are, for example, a coacervation, interfacial polymerization, in situ polymerization, submerged hard coating, air-suspension coating or spray drying methods, or the like, and each of these independently or a combination of two or more of these can be used.

Further, the shape of microcapsules obtained by each of these methods can be of a core/wall or solid solution structures, or of a multilayer structure microcapsulated further. Furthermore, these microcapsules can be either primary particles of a mononuclear shape or secondary aggregates of a multinuclear shape produced by their aggregation.

Among the above microcapsules, as an especially preferable example can be cited the method described in JP, B, 62-28990, which is previously proposed by the assignee.

Next, as a photopolymerization initiator in the ultraviolet hardening type ink compositions of the invention, as far as at least one type of compound selected from an acetophenone type or benzophenone type compounds is used, any ultraviolet hardening type ink composition known so far can be included, whereby the polymerization can be initiated by them.

Consequently, the above-mentioned photopolymerization initiators are indispensable in the ultraviolet hardening type ink compositions of the invention, which may however contain the conventional ingredients as the other components. For example, they may contain a base polymer ingredient comprising a reactive oligomer or a reactive polymer, a monomer ingredient of a reactive diluent, an additive ingredient comprising a sensitizer, a polymerization inhibitor, a stabilizer or the like, and the other supplementary photopolymerization initiator.

Examples are cited in the following.

1) As a base polymer ingredient can be enumerated oligomers, prepolymers, polymers and ethyleneoxide additives or various denaturated products thereof, including urethane (meta) acrylate, epoxy(meta) acrylate, polyester(ether) (meta)acrylate, unsaturated polyester, butadiene type (meta)acrylate, polyol acrylate and melamine acrylate.

2) As a monomer ingredient can be enumerated various kinds of monofunctional monomers of each kind such as alkylacrylates of alkyl groupssuchas methyl, ethyl, n-butyl, 2-ethylhexyl, lauryl, or stearyl, cyclic acrylates of tetrahydrofurfuryl, isoboronyl, cyclohexyl, or the like, aromatic acrylates, acrylates containing the hydroxyl group, acrylates containing the carboxyl group, acrylates containing the amino group, acrylates containing the phosphoric acid group, N-vinylpyrrolidone, acrylamide, N-methylolacrylamide, or acryloyl morpholine, and various kinds of polyfunctional monomers of each kind such as diacrylates of hexanediol, neopentyl glycol, nonanediol or the like, triacrylates of trimethylolpropane, glycerin, pentaerythritol or the like, tetraacrylates of pentaerythritol, ditrimethylolpropane or the like, pentaacrylates and hexaacrylates of dipentaerythritol, glycidyl metaacrylate-acrylic acid adduct, or methylenebisacrylamide.

3) As an ingredient of additives can be enumerated sensitizers such as N-methyldiethanolamine, Michler's ketone, 4-dimethylaminoethyl benzoate or 4-dimethylaminoisoamyl benzoate, and polymerization inhibitors such as hydroquinone or methoquinone.

4) As an acetophenone type or benzophenone type compounds of the photopolymerization initiators featuring the invention are cited, for example, acetophenone type compounds such as acetophenone, dimethoxyacetophenone, 2-phenyl-2,2-dimethoxyacetophenone (2,2-dimethoxy-1,2-diphenyl-ethanone), 2-hydroxy-2,2-dimethoxyacetophenone, trichloroacetophenone, p-methylthio-2-morpholino-2, 2-dimethylacetophenone or 1-hydroxycyclohexylphenyl ketone, and benzophenone type compounds such as benzophenone, [4-[(4-methylphenyl)thio]phenyl]phenyl-methanone, Michler's ketone, [4-phenylthiophenyl]phenyl-methanone, [4-phenylthiophenyl]2'-chlorophenyl-methanone, [4-phenylthiophenyl]4'-methoxyphenyl-methanone, [4-phenylthiophenyl]2', 4'-dichlorophenyl-methanone or chloromethylbenzophenone, though, they are not limited to these only.

Further, as the other supplementary photopolymerization initiator are cited a bezoin ether type, thioxanthone type, acyl phosphine oxide type, α-acyloxime ester type initiators or the like.

The blend ratio of the ultraviolet hardening type ink compositions of the invention is not especially restricted and can be selected within an optional range, though, usually to 100 weight parts of a base polymer ingredient, each of the followings are selected within a respective range of 20–1000 weight parts of a monomer ingredient, preferably 50–500 weight parts, 5–100 weight parts of at least one compound selected from an acetophenone type or benzophenone type compounds, preferably 10–50 weight parts, 0.0001–10 weight parts of an additive ingredient, preferably 0. 001–1 weight parts, 10–500 weight parts of microcapsules with the temperature-sensitive color change property, preferably 30–300 weight parts, and 0–50 weight parts of other photopolymerization initiator.

Further, it is needless to say that any additive known so far can be blended to the above ink composition of the invention.

Illustrative of examples are general dye stuffs and pigments, fluorescent dye stuffs and pigments, light storage (phosphorescent) pigments, pearl pigments, photochromic agents, electrochromic agents, fillers, anti-foaming agents, leveling agents, flavorings, antimicrobials, insecticides, repellents, anti-smelling agents, antiseptics, or the like.

The ultraviolet hardening type ink compositions with the temperature-sensitive color change property according to the invention can be optionally printed on base materials such as paper, plastic, leather, fiber, wood, metal, ceramics, glass, etc. by printing methods such as screen printing, offset lithography, relief printing, flexographic printing, gravure printing, etc., whereby after printing they are hardened by irradiating with UV rays of about 200–400 nm, and for example, picture books, seals, labels, table wares, toys, daily miscellaneous goods, posters, and the like, which have the temperature-sensitive color change property, can be produced. Further, it is ,of course, possible to get detectors of every kind, for example, an easy-type tester for a dry battery or a battery, in which the temperature-sensitive color change function is made a kind of indicator, or to get recording material components of every kind.

DETAILED DESCRIPTION OF THE PREFERRED EMBODIMENTS

In the following, the invention will be illustrated in more detail by way of concrete examples, but the invention is not limited to these examples.

Further, in the following, "part" means "weight part".

EXAMPLE 1

To the ultraviolet hardening type ink composition consisting of bisphenol A epoxydiacrylate ethyleneoxide adduct oligomer (35 parts) as the base polymer ingredient, 2-ethylhexyl acrylate (40 parts) and trimethylolpropane triacrylate (20 parts) as the monomer ingredient, 2,2-dimethoxy-1,2-diphenyl-ethanone (5 parts) as the photopolymerization initiator, and hydroquinone (0.05 parts) as the polymerization inhibitor, the microcapsules (20 parts) with the temperature-sensitive color change property which do not contain an ultraviolet absorber (The three ingredients type composition comprising crystal violet lacton as the leuco compound, bisphenol A as the developer and myristyl alcohol as the organic medium was encapsulated by making a solid solution with a melamine type resin and further coating with ahydrophilicpolymer. The mean particle diameter is 12 $\mu$m.) and the silicon type anti-foaming agent (0.5 parts) were uniformly dispersed to give the ultraviolet hardening type ink composition with the temperature-sensitive color change property according to the invention.

After the optional pattern was printed on a plastic film by using the above ink composition, UV rays were irradiated by a mercury lamp to make the printing matter hardened.

The printing matter thus obtained showed deep blue color not more than 25° C. and became colorless not less than 35° C. demonstrating the reversible color change phenomenon.

Further, the hardening property (strength) and the light resistance were extremely excellent.

COMPARATIVE EXAMPLE 1

The comparative ultraviolet hardening type ink composition was obtained by the same way as that of Example 1 except changing 2,2-dimethoxy-1,2-diphenyl-ethanone (5 parts) as the photopolymerization initiator to the thioxanthone type initiator (5 parts, KAYACURE ITX, made by Nihon Kayaku), followed by the same procedure to give a printing matter.

The printing matter thus obtained demonstrated the reversible temperature-sensitive color change phenomenon similar to that of Example 1 in the initial period, but the exposure by sunlight only for 10 hours let the color change to yellow, resulting to not showing the temperature-sensitive color change phenomenon completely, and it was extremely inferior in light resistance. Additionally, it was inferior in the hardening property (strength) to that of Example 1.

COMPARATIVE EXAMPLE 2

The comparative ultraviolet hardening type ink composition was obtained by the same way as that of Example 1 except changing the microcapsules with the temperature-sensitive color change property (20 parts) used in Example 1 to the comparative microcapsules (21 parts) in which the ultraviolet absorber (2-(3,5-di-t-amyl-2-hydroxyphenyl) benzotriazole, 1 part) was added to the microcapsules used in Example 1.

After the optional pattern was printed on a plastic film by using the above ink composition in the same way as that of Example 1, UV rays were irradiated by a mercury lamp to make the printing matter hardened, though, it could not be fully hardened.

COMPARATIVE EXAMPLE 3

The comparative ultraviolet hardening type ink composition was obtained by the same way as that of Example 1 except changing the microcapsules with the temperature-sensitive color change property (20 parts) used in Example 1 to the comparative microcapsules (20 parts) in which the mean particle diameter was 0.3 μm.

After the optional pattern was printed on a plastic film by using the above ink composition in the same way as that of Example 1, UV rays were irradiated by a mercury lamp to make the printing matter hardened, though, it could not be fully hardened.

Further, also in the temperature-sensitive color change phenomenon of the ink composition itself, the color concentration was low at the temperature of not more than 25° C., and due to showing a pale blue colored with white, the clear color change phenomenon such as that in Example 1 could not be shown.

COMPARATIVE EXAMPLE 4

The comparative ultraviolet hardening type ink composition was obtained by the same way as that of Example 1 except changing the microcapsules with the temperature-sensitive color change property (20 parts) used in Example 1 to the comparative microcapsules (20 parts) in which the mean particle diameter was 75 μm, followed by the same procedure to give a printing matter.

The printing matter thus obtained gave the surface with a gritty feeling and was inferior in the printing strength.

EXAMPLES 2–15 AND COMPARATIVE EXAMPLE 5–12

The test results of Examples 2–15 and Comparative Examples 5–12 for the printing matters similar to those of Example 1 which were obtained by the same way as that of Example 1 using the ultraviolet hardening type ink compositions listed in Tables 1–3, were shown together with those of Example 1 and Comparative Examples 2–4 in Tables 1–3.

EXAMPLE 16

To the ultraviolet hardening type ink composition with the temperature-sensitive color change property in Example 1 was further added with 0.5 parts of the red organic pigment (quinacridone red) to give the ultraviolet hardening type ink composition with the temperature-sensitive color change property according to the invention.

After the optional pattern was printed on a metal plate by using the above ink composition, UV rays were irradiated by a mercury lamp to make the printing matter hardened.

The printing matter thus obtained showed deep violet color not more than 25° C. and became red not less than 35° C. demonstrating the reversible color change phenomenon.

Further, the hardening property (strength) and the light resistance were extremely excellent as same as those of Example 1.

Advantageous Effects of the Invention

Since the ultraviolet hardening type ink compositions with the temperature-sensitive color change property according to the invention are especially excellent not only in the light resistance, but in the hardening property, the temperature-sensitive color change property and the like even without using ultraviolet absorbers, use of the ink compositions of the invention gives printing matters or the like which have especially excellent characteristics in the light resistance, the hardening property, the temperature-sensitive color change property, and the like. In these respects they are valuable.

Additionally, owing to not using the ultraviolet absorbers and the like, the compositions of the invention have less restrictions than those of the conventional methods, whereby the invention is also valuable in the point that it becomes applicable to many arts.

TABLE 1

| Example or Comparative Example | Microcapsules with the temperature sensitive color change property | Ultraviolet absorbers | Mean particle diameter (μm) | Base polymer | Monomer | Acetophenone, Benzophenone type photo-polymerization initiators | Other photo-polymerization initiators | Additives | Light resistance and color change behavior | Hardening property and others |
|---|---|---|---|---|---|---|---|---|---|---|
| Example 1 | A (20) | — | 12 | P1 (35) | M1 (40) M5 (20) | IA1 (5) | — | D1 (0.05) | ○ | ○ |
| Comparative Example 1 | A (20) | — | 12 | P1 (35) | M1 (40) M5 (20) | — | IC1 (5) | D1 (0.05) | X | Δ |
| Comparative Example 2 | A (20) | a (1) | 12 | P1 (35) | M1 (40) M5 (20) | IA1 (5) | — | D1 (0.05) | ○ | X |
| Comparative Example 3 | A (20) | — | 0.3 | P1 (35) | M1 (40) M5 (20) | IA1 (5) | — | D1 (0.05) | Δ | X |
| Comparative Example 4 | A (20) | — | 75 | P1 (35) | M1 (40) M5 (20) | IA1 (5) | — | D1 (0.05) | ○ | X |
| Example 2 | A (20) | — | 12 | P1 (35) | M1 (40) M5 (20) | IA2 (5) | — | D1 (0.05) | ○ | ○ |
| Example 3 | A (20) | — | 12 | P1 (35) | M1 (40) M5 (20) | IA3 (5) | — | D1 (0.05) | ○ | ○ |
| Example 4 | A (20) | — | 12 | P1 (35) | M1 (40) M5 (20) | IB1 (5) | — | D1 (0.05) D2 (3) | ○ | ○ |

TABLE 1-continued

| Example or Comparative Example | Microcapsules with the temperature sensitive color change property | Ultraviolet absorbers | Mean particle diameter (μm) | Base polymer | Monomer | Acetophenone, Benzophenone type photo-polymerization initiators | Other photo-polymerization initiators | Additives | Light resistance and color change behavior | Hardening property and others |
|---|---|---|---|---|---|---|---|---|---|---|
| Example 5 | A (20) | — | 12 | P1 (35) | M1 (40) M5 (20) | IB2 (5) | — | D1 (0.05) D2 (1) | ○ | ○ |

The figures in the parentheses show the weight parts.

TABLE 2

| Example or Comparative Example | Microcapsules with the temperature sensitive color change property | Ultraviolet absorbers | Mean particle diameter (μm) | Base polymer | Monomer | Acetophenone, Benzophenone type photo-polymerization initiators | Other photo-polymerization initiators | Additives | Light resistance and color change behavior | Hardening property and others |
|---|---|---|---|---|---|---|---|---|---|---|
| Example 6 | A (20) | — | 12 | P1 (35) | M1 (40) M5 (20) | IB3 (5) | — | D1 (0.05) D2 (0.5) | ○ | ○ |
| Example 7 | A (20) | — | 12 | P1 (35) | M1 (40) M5 (20) | IA1 (3) IB2 (2) | — | D1 (0.05) D2 (0.1) | ○ | ○ |
| Example 8 | A (20) | — | 12 | P1 (35) | M1 (40) M5 (20) | IA1 (3) IA2 (2) | — | D1 (0.05) | ○ | ○ |
| Example 9 | A (20) | — | 12 | P1 (35) | M1 (40) M5 (20) | IA1 (4) | IC4 (1) | D1 (0.05) | ○ | ○ |
| Comparative Example 5 | A (20) | — | 12 | P1 (35) | M1 (40) M5 (20) | — | IC2 (5) | D1 (0.05) | X | Δ |
| Comparative Example 6 | A (20) | — | 12 | P1 (35) | M1 (40) M5 (20) | — | IC3 (5) | D1 (0.05) | X | Δ |
| Example 10 | B (20) | — | 10 | P1 (35) | M1 (40) M5 (20) | IA1 (5) | — | D1 (0.05) | ○ | ○ |
| Example 11 | C (20) | — | 25 | P1 (35) | M1 (40) M5 (20) | IA1 (5) | — | D1 (0.05) | ○ | ○ |
| Comparative Example 7 | B (20) | — | 0.1 | P1 (35) | M1 (40) M5 (20) | IA1 (5) | — | D1 (0.05) | Δ | X |

The figures in the parentheses show the weight parts.

TABLE 3

| Example or Comparative Example | Microcapsules with the temperature sensitive color change property | Ultraviolet absorbers | Mean particle diameter (μm) | Base polymer | Monomer | Acetophenone, Benzophenone type photo-polymerization initiators | Other photo-polymerization initiators | Additives | Light resistance and color change behavior | Hardening property and others |
|---|---|---|---|---|---|---|---|---|---|---|
| Comparative Example 8 | C (20) | — | 100 | P1 (35) | M1 (40) M5 (20) | IA1 (5) | — | D1 (0.05) | ○ | X |
| Example 12 | B (25) | — | 10 | P2 (30) | M2 (40) M4 (20) | IA2 (4) | IC2 (2) | D1 (0.05) | ○ | ○ |
| Example 13 | B (25) | — | 10 | P1 (20) P3 (20) | M1 (20) M3 (20) M5 (20) | IA1 (5) | — | D1 (0.05) | ○ | ○ |

TABLE 3-continued

| Example or Comparative Example | Microcapsules with the temperature sensitive color change property | Ultraviolet absorbers | Mean particle diameter (μm) | Base polymer | Monomer | Acetophenone, Benzophenone type photopolymerization initiators | Other photopolymerization initiators | Additives | Light resistance and color change behavior | Hardening property and others |
|---|---|---|---|---|---|---|---|---|---|---|
| Example 14 | C (30) | — | 25 | P2 (20) P3 (15) | M2 (40) M4 (20) | IB2 (4) IB3 (1) | — | D1 (0.05) D2 (1) | ○ | ○ |
| Example 15 | A (20) | — | 12 | P1 (15) P2 (20) | M2 (30) M3 (10) M4 (20) | IA2 (5) | — | D1 (0.05) | ○ | ○ |
| Comparative Example 9 | B (25) | — | 10 | P2 (30) | M2 (40) M4 (20) | — | IC1 (5) | D1 (0.05) D2 (1) | X | Δ |
| Comparative Example 10 | C (30) | — | 25 | P2 (20) P3 (20) | M2 (40) M4 (20) | — | IC3 (5) | D1 (0.05) | X | Δ |
| Comparative Example 11 | B (25) | b (1) | 10 | P1 (20) P3 (20) | M1 (20) M3 (20) M5 (20) | IA1 (5) | — | D1 (0.05) | ○ | X |
| Comparative Example 12 | C (30) | a (1) | 25 | P2 (20) P3 (15) | M2 (40) M4 (20) | IB2 (4) IB3 (1) | — | D1 (0.05) D2 (1) | ○ | X |

The figures in the parentheses show the weight parts.

Notes:
Each abbreviation in Tables 1–3 represents the following meanings.

1. Microcapsules with the temperature-sensitive color change property

A . . . The three ingredients type composition comprising crystal violet lacton as the leuco compound, bisphenol A as the developer and myristyl alcohol as the organic medium was encapsulated by making a solid solution with amelamine type resin and further coating with a hydrophilic polymer.
   (This showed blue color not more than 25° C. and became colorless not less than 35° C. demonstrating the reversible color change phenomenon.)

B . . . The three ingredients type composition containing 2-anilino-3-methyl-6-diethylaminofluoran as the leuco compound, bisphenol A as the developer, myristyl stearate as the organic medium was encapsulated by coating with an epoxy resin.
   (This showed black color not more than 45° C. and became colorless not less than 50° C. demonstrating the reversible color change phenomenon.)

C . . . The three ingredients type composition containing 2-chloro-3-methyl-6-diethylaminofluoran as the leuco compound, 2,2'-bisphenol as the developer, myristyl alcohol and lauryl laurate as the organic medium was encapsulated by coating with gelatin.
   (This showed red color not more than 10° C. and became colorless not less than 20° C. demonstrating the reversible color change phenomenon.)

2. Ultraviolet absorbers contained in microcapsules with the temperature-sensitive color change property
   a . . . 2-(3,5-Di-t-amyl-2-hydroxyphenyl)benzotriazole,
   b . . . 2-(3-t-Butyl-5-methyl-2-hydroxyphenyl)-5-chlorobenzotriazole.

3. Base polymer ingredients
   P1 . . . Bisphenol A epoxydiacrylate ethyleneoxide adduct oligomer (oligomer of bis(4-acryloxypolyethoxyphenyl)propane,
   P2 . . . Urethane acrylate type oligomer,
   P3 . . . polyester acrylate type oligomer.

4. Monomer ingredients
   M1 . . . 2-Ethylhexyl acrylate,
   M2 . . . Tetrahydrofurfryl acrylate,
   M3 . . . N-Vinylpyrrolidone,
   M4 . . . Hexanediol acrylate,
   M5 . . . Trimethylolpropane triacrylate.

5. Acetophenone type or benzophenone type photopolymerization initiators
   IA1 . . . 2,2-Dimethoxy-1,2-diphenyl-ethanone,
   IA2 . . . p-Methylthio-2-morpholino-2,2-dimethylacetophenone,
   IA3 . . . 1-Hydroxycyclohexyl phenyl ketone,
   IB1 . . . [4-[(4-Methylphenyl)thio]phenyl]phenylmethanone,
   IB2 . . . [4-Phenylthiophenyl]2', 4'-dichlorophenylmethanone,
   IB3 . . . Chloromethylbenzophenone.

6. Other photopolymerization initiators
   IC1 . . . Thioxanthone type initiator (KAYACURE ITX, made by Nihon Kayaku),
   IC2 . . . Acylphosphineoxide type initiator (LUCIRINTPO, made by BASF),
   IC3 . . . Methyl benzoylformate,
   IC4 . . . benzoin isobutyl ether.

7. Additive ingredients
   D1 . . . Hydroquinone,
   D2 . . . 4-Dimethylaminoethyl benzoate.

8. Light resistance and color change behavior
   (○) After exposure by sunlight for 10 hours, it was confirmed by visual examination that the color change behavior did not change compared with that observed before the exposure.

(Δ) Since the color phase is colored with white at the time of coloring, a remarkable color change behavior was not shown.

(x) After an exposure by sunlight for 10 hours, the inferior color change behavior compared with that previous to the exposure was confirmed, or no color change behavior was shown.

9. Hardening property and others (○) After hardening the printing matter prepared by said ink composition by irradiating UV rays, the print surface of the printing matter was tested by scratching with a pencil of the hard level B, and as the result, there was no flaw on the print surface.

(Δ) After hardening the printing matter prepared by said ink composition by irradiating UV rays, the print surface of the printing matter was tested by scratching with a pencil of the hard level B, and as the result, a little flaw was observed on the print surface, or a part of only the surface layer was detached, or the surface gave a gritty feeling.

(x) After hardening the printing matter prepared by said ink composition by irradiating UV rays, the print surface of the printing matter was tested by scratching with a pencil of the hard level B, and as the result, the print surface was deeply flawed, or detached, or the microcapsules were left out. Or the hardening itself was not sufficient, and therefore, the adhering property was shown or the hardening was not attained.

Further, the above hardening conditions was to irradiate UV rays at the irradiation length of 90 mm and the conveyor speed of 10 m/min. (the accumulated amount of light: 180 mJ/cm$^2$) by a high-pressure mercury lamp of 120 W/cm.

What is claimed is:

1. Ultraviolet hardening ink compositions comprising microcapsules with a temperature-sensitive color change property and a photopolymerization initiator, wherein said microcapsules consist essentially of:
   (a) a leuco compound;
   (b) an organic developer; and
   (c) an organic medium selected from the group consisting of esters, ethers, alcohols, ketones, carboxylic acids, or azomethines,
      but do not contain ultraviolet absorber having a specific absorption wave length of 220–380 nm, and have a mean diameter of 0.5–50 μm, whereas said photopolymerization initiator comprises at least one of the compounds selected from acetophenone compounds and benzophenone compounds.

2. Ultraviolet hardening type ink compositions according to claim 1, wherein the photopolymerization initiator comprises at least one of the compounds selected from 2,2-dimethoxy-1,2-diphenylethanone, p-methylthio-2-morpholino-2,2-dimethylacetophenone, 1-hydroxycyclohexylphenylketone, [4-[(4-methylphenyl)thio]phenyl]phenyl-methanone, [4-phenylthiophenyl]-2',4'-dichlorophenyl-methanone and chloromethylbenzophenone.

3. Ultraviolet hardening ink compositions according to claim 1, wherein said microcapsules contain no ultraviolet absorber having a specific absorption wave length of 220–380 nm and have a mean diameter of 0.5–50 μm, whereas said photopolymerization initiator comprises at least one compound selected from the group consisting of 2,2-dimethoxy-1,2-diphenylethanone, p-methylthio-2-morpholino-2,2-dimethylacetophenone, (4-((4-methylphenyl)thio)phenyl)phenyl-methanone, (4-phenylthiophenyl)-2', 4'-dichlorophenyl-methanone and chloromethylbenzophenone.

4. Ultraviolet hardening ink compositions according to claim 1, wherein said microcapsules contain no ultraviolet absorber having a specific absorption wave length of 220–380 nm and have a mean diameter of 0.5–50 μm, whereas said photopolymerization initiator comprises at least one compound selected from the group consisting of dimethoxyacetophenone, dimethoxyacetophenone, trichloracetophenone, (4-phenylthiophenyl) phenyl-methanone, (4-phenylthiophenyl)2'-chlorophenyl-methanone, and (4-phenylthiophenyl)4'-methoxyphenyl-methanone.

5. Ultraviolet hardening ink compositions according to claim 1, wherein said microcapsules contain no ultraviolet absorber having a specific absorption wave length of 220–380 nm and have a mean diameter of 0.5–50 μm, whereas said photopolymerization initiator comprises at least one compound selected from the group consisting of 1-hydroxycyclohexylphenylketone and Michler's ketone.

* * * * *